US009404219B2

(12) United States Patent
Godard

(10) Patent No.: US 9,404,219 B2
(45) Date of Patent: Aug. 2, 2016

(54) HIGH-DURABILITY SHEET FOR MANUFACTURING BANK NOTES

(71) Applicant: ARJOWIGGINS SECURITY, Boulogne-billancourt (FR)

(72) Inventor: Vincent Godard, Villieu-loyes-mollon (FR)

(73) Assignee: Arjowiggins Security, Boulogne-Billancourt (FR)

( * ) Notice: Subject to any disclaimer, the term of this patent is extended or adjusted under 35 U.S.C. 154(b) by 0 days.

(21) Appl. No.: 14/082,830

(22) Filed: Nov. 18, 2013

(65) Prior Publication Data

US 2014/0116634 A1     May 1, 2014

Related U.S. Application Data

(63) Continuation of application No. PCT/IB2012/052417, filed on May 15, 2012.

(51) Int. Cl.

| D21H 19/10 | (2006.01) |
|---|---|
| D21H 19/36 | (2006.01) |
| D21H 17/41 | (2006.01) |
| D21H 17/57 | (2006.01) |
| D21H 19/62 | (2006.01) |
| D21H 19/82 | (2006.01) |
| D21H 27/00 | (2006.01) |
| B32B 27/12 | (2006.01) |

(52) U.S. Cl.
CPC ............... *D21H 19/10* (2013.01); *B32B 27/12* (2013.01); *D21H 17/57* (2013.01); *D21H 19/62* (2013.01); *D21H 19/82* (2013.01); *D21H 27/00* (2013.01); *B32B 2554/00* (2013.01)

(58) Field of Classification Search
USPC ...................... 162/135, 137, 140, 158, 164.1, 162/168.1–2, 181.6; 106/287.1, 287.27, 106/287.28
See application file for complete search history.

(56) References Cited

U.S. PATENT DOCUMENTS

| 3,288,632 | A | 11/1966 | Rush et al. |
| 5,660,919 | A | 8/1997 | Vallee et al. |
| 6,548,120 | B1 | 4/2003 | Wittosch et al. |
| 2004/0023008 | A1 | 2/2004 | Rosset |
| 2005/0008794 | A1 | 1/2005 | Graczyk et al. |
| 2006/0127649 | A1 | 6/2006 | Keller et al. |
| 2007/0017647 | A1* | 1/2007 | Habik et al. ................ 162/140 |
| 2008/0085384 | A1* | 4/2008 | Ylitalo ............... B41M 5/506 428/32.25 |
| 2008/0085385 | A1* | 4/2008 | Ylitalo ................. B41M 5/52 428/32.38 |

FOREIGN PATENT DOCUMENTS

| EP | 0514455 | B1 | 9/1994 |
| EP | 0815321 | B1 | 11/1999 |
| EP | 1783273 | A1 | 11/2007 |
| EP | 1854641 | A2 | 11/2007 |
| EP | 1545902 | B1 | 7/2008 |
| EP | 1827823 | B1 | 1/2010 |
| WO | 9628610 | A1 | 9/1996 |
| WO | 2004060687 | A1 | 7/2004 |
| WO | 2008054580 | A1 | 5/2008 |

OTHER PUBLICATIONS

Smook, Gary A., Handbook for Pulp and Paper Technologists, 2nd ed, Angus Wilde Publications, 1992, p. 283.*
"Density of Polymers", Scientific Polymer, Inc. [online], 7 pages, 2013, Retrieved from the Internet, [retrieved Jan. 2, 2015], <URL: http://scientificpolymer.com/density-of-polymers-by-density>.*
"Density of Plastics", DOTMAR Engineering Plastics Products, [online], 2 pages, no date, Retrieved from the Internet, [retrieved Jan. 7, 2015], <URL: http://www.dotmar.com.au/density.html>.*
"UV-Light-Sensitive Urethane Acrylate Oligomers", Paint & Coatings Industry, 2005, 9 pages [online], retrieved from the Internet, [retrieved Nov. 7, 2015], <URL: http://www.pcimag.com/articles/83423-uv-light-sensitive-urethane-acrylate-oligomers>.*
French Preliminary Search Report for FR 1154324, completed on Jul. 18, 2011.
Translation of Preliminary Search Report for FR 1154324, completed on Jul. 18, 2011.
International Search Report for PCT/IB2012/052417 (filed on May 15, 2012) with a mailing date of Jul. 13, 2012.
UV Curable Printing Inks. Sartomer Arkema Group: Innovating with You in Mind. Apr. 2015: 2 pages.

* cited by examiner

*Primary Examiner* — Dennis Cordray
(74) *Attorney, Agent, or Firm* — Nilay J. Choksi; Smith & Hopen, P.A.

(57) ABSTRACT

A high-durability paper and method of manufacture thereof. The paper may be intended for manufacturing bank notes, offering good resistance to circulation, especially good resistance to pulverulent soiling in dry medium, to friction in wet medium and to soiling in wet medium, which is moreover appropriately capable of satisfying all the manufacturing constraints, especially the printing constraints. The high-durability paper includes a fibrous substrate, and a protective coat completely covering at least one face of the fibrous substrate, where the protect coat includes at least one base layer on the substrate side and a polyurethane-based outer printability layer that covers the base layer.

30 Claims, No Drawings

HIGH-DURABILITY SHEET FOR MANUFACTURING BANK NOTES

CROSS-REFERENCE TO RELATED APPLICATIONS

This nonprovisional application is a continuation of and claims priority to PCT Application No. PCT/IB2012/052417, entitled "High-durability sheet for manufacturing bank notes", filed May 15, 2012 by the same inventor, which claims priority to French Application No. FR 11 54324, entitled "High-Durability Sheet for Manufacturing Bank Notes", filed May 18, 2011, both of which are incorporated herein by reference in their entireties.

BACKGROUND OF THE INVENTION

1. Field of the Invention

This invention relates, generally, to security papers. More specifically, it relates to security papers intended for manufacturing bank notes and a process for manufacturing such papers.

2. Brief Description of the Prior Art

Bank notes are exposed during their service life to much handling and risk of soiling. In order to give them high durability, the fibrous substrate is protected with one or more layers of a protective coating which has a barrier effect against soiling.

The choice of the protective coating is complex, since it must both provide a barrier function and not excessively impair the printability of the paper during the manufacture of the notes.

Many protective coatings have already been disclosed in the prior art.

For example, EPO patent no. EP 514 455 B1 discloses improving the resistance to circulation of bank notes by impregnating the fibrous substrate, before printing, with a composition which contains one or more binders chosen for their mechanical properties.

According to said patent, at least one of the faces of the fibrous substrate is treated with a composition comprising one or more fillers chosen from mineral tillers and/or plastic coating pigments, and at least one elastomeric binder in an amount greater than 25 parts per 100 parts by dry weight of filler. The elastomeric binder may be chosen from the group formed by aqueous dispersions of polyurethane, of acrylate copolymer, of optionally carboxylated styrene-butadiene copolymer, of polymers for which one of the monomers is acrylonitrile or isoprene or neoprene, or mixtures thereof. Preferably, a polyurethane is used. The filler is preferably mineral, chosen from silicas and kaolins. To deposit the coating layer, an air-knife coater is preferred, so as to respect the watermark.

The papers made by using the teaching of said patent are satisfactory overall in the sense that they have good resistance to abrasion of the primed paper and also satisfactory resistance to soiling with respect to greases and pigments in liquid medium. However, their resistance with respect to greases and minerals in pulverulent medium could still be further improved.

Patent application U.S. 2007/0017647 A1 discloses a paper for manufacturing bank notes, which has improved resistance to soiling. According to the teaching of said patent application, the protective coating comprises at least two layers applied successively, including a base layer which is in contact with the fibrous substrate and closes its pores and an outer layer which protects the substrate against physical and chemical influences. The base layer may comprise polyurethane, while the outer layer is preferentially photo-crosslinkable. The application of the base layer may be performed by flexographic printing. In one example, the base layer is an aqueous dispersion of a polyurethane styrene acrylic mixture, while the outer layer is a styrene acrylic aqueous dispersion. When the outer layer is crosslinkable by drying, it may comprise an aqueous dispersion, preferably without polyurethane, for example based on styrene acrylic.

WO 96/28610 discloses the application of a polyurethane-based liquid composition to a fibrous substrate, in order to form a protective coating.

U.S. 2006/0127649 indicates that the application of a liquid composition makes it possible to obtain better resistance to soiling, but does not improve the mechanical stability of the substrate.

Patent application U.S. 2004/0023008 A1 discloses a security paper for manufacturing bank notes. The paper comprises a fibrous substrate which is coated on at least one of its faces with a transparent or translucent protective layer comprising colloidal silica, and at least one transparent or translucent elastomeric binder, for example comprising polyurethane.

Publication WO 2008/054580 A1 discloses a process for giving a fibrous substrate resistance to humidity and to soiling, which consists in impregnating the substrate on two opposite faces with an aqueous composition comprising one or more thermoplastic resins chosen from resins bearing an ester bond, polyurethane resins, functionalized polyurethane and copolymers and mixtures of these resins. More particularly, the resins may be chosen from aqueous dispersions of a polymer, in particular bearing resin particles chosen from polyurethane, polyether-urethane and urethane-acrylic resins and mixtures thereof. In a preferred embodiment, the composition that is applied comprises, besides the aqueous polymer dispersion, one or more pigments such as titanium dioxide and optionally one or more crosslinking agents.

U.S. Pat. No. 1,499,235 discloses the improvement of the resistance to circulation of a bank note by impregnating the fibrous substrate with a latex comprising a copolymer based on carboxylated styrene and butadiene.

Patent EP 815 321 B1 discloses a paper for manufacturing bank notes, in which an aqueous polyurethane dispersion is deposited on the fibrous substrate, this polyurethane dispersion being free of fillers and transparent.

High-durability papers in which a fibrous substrate is coated with a PET film bonded to the substrate via a polyurethane-based adhesive, this PET film itself being covered with an acrylic varnish, are moreover known, as described in publications EP 1 545 902, EP 1 854 641 and EP 1 827 823.

The known solutions are not entirely satisfactory in terms of manufacturing cost and/or performance.

U.S. Pat. No. 3,288,632 discloses a process for manufacturing glazed paper, intended for the manufacture of magazines or books, of high opacity. This process comprises the successive application of two highly pigmented layers. The teaching of said patent cannot be applied to papers intended for manufacturing bank notes, for which high opacity of the layer(s) is not sought on account of the presence of securities which must be visible in transmitted or reflected light, for instance a watermark, registration-mark prints or security threads.

EP 1 783 273 discloses a security paper with improved durability, in which a composition containing a fluorinated resin is applied to the surface. This composition may be mixed with additional compounds. However, this reference faces similar challenges as previously discussed.

Accordingly, what is needed is an improved durability sheet for the purpose of manufacturing bank notes. However, in view of the art considered as a whole at the time the present invention was made, it was not obvious to those of ordinary skill in the field of this invention how the shortcomings of the prior art could be overcome.

While certain aspects of conventional technologies have been discussed to facilitate disclosure of the invention, Applicants in no way disclaim these technical aspects, and it is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

BRIEF SUMMARY OF THE INVENTION

The long-standing but heretofore unfulfilled need for an improved high-durability sheet, in particular in the field of manufacturing bank notes, is now met by a new, useful, and nonobvious invention.

In an embodiment, the invention is a high-durability sheet of paper, especially for manufacturing bank notes, comprising a fibrous substrate, and a protective coat totally covering at least one face of the fibrous substrate, where this coat comprising at least one base layer on the substrate side and a polyurethane-based outer printability layer, covering the base layer. The outer printability layer is intended to receive at least one print, for example intaglio. Thus, the fibrous substrate is not printed directly. Printing is done on the protective coating.

The outer printability layer may include, in a particular embodiment of the invention, a polymer particle filler, which is preferably organic, for example a polyethylene, polyamide or polypropylene powder or an acrylic or styrene polymer powder. This layer may further or alternatively include a mineral filler (silica, kaolin, talc, calcium carbonate), which improves printability. The polymer and/or mineral filler should be non-opacifying by nature.

The base layer may comprise a polyolefin, preferably polyethylene (PE). As a variant, the base layer comprises polyvinylidene chloride (PVDC). As a further variant, the base layer comprises polyurethane, an acrylic polymer, a styrene polymer or a fluorinated polymer, for example of the polyvinylidene fluoride (PVDF) type. The base layer may be free of fillers, in particular of mineral fillers or of polymer particle fillers. Preferably, the polyethylene is a modified polyethylene, especially comprising acid groups and preferably carboxylic acid groups.

The coating may comprise only the above two layers; as a variant, the coating may comprise one or more intermediate layers, in particular of identical nature to one of the above-mentioned layers.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

DETAILED DESCRIPTION OF THE PREFERRED EMBODIMENT

In the following detailed description of the preferred embodiments, it is to be understood that other embodiments may be utilized and structural changes may be made without departing from the scope of the invention.

The invention is directed toward producing a high-durability paper, which is especially intended for manufacturing bank notes, offering good resistance to circulation, especially good resistance to pulverulent soiling in dry medium, to friction in wet medium and to soiling in wet medium, which is moreover appropriately capable of satisfying all the manufacturing constraints, especially the printing constraints.

The invention is also directed toward producing a high-durability paper which can be manufactured at a relatively low cost.

According to a first of its aspects, a subject of the invention is thus a high-durability sheet of paper, especially for manufacturing bank notes, comprising:

a fibrous substrate, a protective coat totally covering at least one face of the fibrous substrate, this coat comprising at least one base layer on the substrate side and a polyurethane-based outer printability layer, covering the base layer.

Advantageously, the outer printability layer is non-fluorinated, i.e. it is free of fluorinated resins, especially resins comprising C—F, $CF_2$ or $CF_3$ groups.

The outer printability layer is intended to receive at least one print, for example intaglio.

Thus, the fibrous substrate is not printed directly. Printing is done on the protective coating.

By means of the invention it is possible to benefit from a paper with increased resistance to circulation, and in particular which has both good resistance to pulverulent soiling in dry medium, good resistance of the prints to friction and to abrasion and good resistance to soiling in wet medium, while at the same time being compatible with the printing techniques used for printing bank notes.

The invention makes it possible to not use a film which is sized or produced by extrusion, the use of which significantly increases the manufacturing cost of the sheets produced. The invention makes it possible to use conventional coating, impregnation or surfacing means, commonly used in the paper industry, to deposit the base layer and the outer printability layer.

The coating according to the invention, and in particular the base layer, gives the fibrous substrate protection and increased resistance to soiling. In contrast with the majority of the layers applied by coating, impregnation or surfacing in papermaking, which are opacifying pigmented layers for improving the printability and the surface aspect, the coating layers according to the invention are sparingly pigmented or unpigmented, and are more closely related in their composition to varnishes generally applied via printing processes, and thus usually off the paper machine and after printing of the paper.

The total thickness of the protective coat is preferably greater than or equal to 3 µm, especially between 5 and 25 µm. The basis weight of the protective coat is preferably less than or equal to 25 g/m² per face.

The outer printability layer advantageously comprises a polymer particle and/or mineral filler, which makes it possible to improve the printability. The polymer particle and/or mineral filler is preferably in a mass content, by dry weight, relative to the total weight of the outer printability layer of less than 50%, better still between 5% and 25% and even better still between 6% and 10%. The mineral filler advantageously comprises silica and/or kaolin and/or talc and/or calcium carbonate. Preferably, the polymer particle and/or mineral filler is non-opacifying by virtue of its natural transparency and/or its dimensions of the order of a micron, especially less than 10 µm.

The outer printability layer comprises, in a particular embodiment of the invention, a polymer particle filler, which is preferably organic, for example a polyethylene, polyamide or polypropylene powder or an acrylic or styrene polymer powder.

The outer printability layer is preferably transparent or translucent.

The outer printability layer preferably comprises at least 25%, better still at least 30% and more preferentially at least 50% by dry weight of polyurethane and, according to a particularly advantageous variant, the outer printability layer comprises between 25% and 50% by dry weight of polyurethane, preferably mixed with an acrylic compound, especially with substantially equal amounts of polyurethane and of acrylic compound.

The base layer may comprise a polyolefin, preferably polyethylene (PE). As a variant, the base layer comprises polyvinylidene chloride (PVDC). As a further variant, the base layer comprises polyurethane, an acrylic polymer, a styrene polymer or a fluorinated polymer, for example of the polyvinylidene fluoride (PVDF) type. The base layer may be free of fillers, in particular of mineral fillers or of polymer particle fillers. Preferably, the polyethylene is a modified polyethylene, especially comprising acid groups and preferably carboxylic acid groups.

The thickness of the base layer, per face, ranges, for example, from 1 to 24 µm. The basis weight of the base layer ranges, for example, from 1 to 24 g/m² and preferably from 2 to 5 g/m².

The thickness of the outer printability layer, per face, ranges, for example, from 1 to 24 µm. The basis weight of the outer layer ranges, for example, from 1 to 24 µm² and preferably from 2 to 5 g/m².

The base layer is preferably transparent or translucent.

The coating may comprise only the above two layers; as a variant, the coating may comprise one or more intermediate layers, in particular of identical nature to one of the abovementioned layers.

According to a particular case, at least one of the layers of said coat comprises a two-component system, referred to as being pro-polyurethane. In particular, said two-component system uses a polyaddition reaction between an isocyanate oligomer and a polyol oligomer. In addition, said two-component system makes it possible to synthesize in situ, i.e. on the substrate, a polyurethane.

According to a particular case, at least one of the layers of said coat comprises a crosslinkable polymer, which is in particular crosslinkable under the effect of ultraviolet (UV) radiation. According to a particular case, said crosslinkable polymer is a polyurethane.

Preferably, the deposition of the outer printability layer is performed on line.

The deposition of the base layer and that of the outer printability layer preferably take place on the two faces of the substrate. In particular, any layering system suitable for "two-face layering" (C-2-S) may be used to deposit said layers. Preferably, an air-knife layering system is used. The deposition may also be made, inter alia, by curtain layering, by pencil layering, by roll layering, in particular predozed, etched or transfer layering, or by dipping, by impregnation, by surface coating or by spraying.

Preferably, the fibrous substrate is covered on each of its faces with the coat.

Preferably, the fibrous substrate is impregnated with a binder for reducing its porosity, preferably based on polyvinyl alcohol (PVA). The PVA is dissolved in water to a proportion of 1% to 10% by weight and preferably between 3% and 6% before impregnation of the paper substrate.

The fibrous substrate may incorporate at least one security element.

According to another of its aspects, a subject of the invention is also a process for manufacturing a high-durability sheet, especially for bank notes, comprising the step consisting in on-line layering in the fluid state on a fibrous substrate of a base layer and in on-line or off-line layering on the base layer of a polyurethane-based outer printability layer.

The layering of the outer printability layer may take place directly on the base layer, preferably after drying it.

According to an advantageous characteristic of the process, the deposition of the base layer takes place on line using a two-roll treater.

The fibrous substrate is preferably sized prior to the deposition the base layer, especially prior to its passage through the abovementioned two-roll treater. The sizing is preferably performed with a PVA-based binder. Other binders may be envisioned in addition to or in replacement for PVA, for instance dispersions based on styrene or acrylic polymers.

The base layer may be deposited in an amount ranging from 1 to 24 g/m² and preferably between 2 and 4 g/m² per face, by dry weight. The outer printability layer may be deposited in an amount ranging from 1 to 24 g/m² and preferably between 2 and 5 µm² per face, by dry weight.

The base layer may comprise a polymer chosen from polyurethanes (PU), polyolefins, in particular polyethylene, PVDC, acrylic polymers, styrene polymers and fluorinated polymers, especially PVDF, and also mixtures and copolymers thereof.

The outer printability layer preferably comprises at least 50% by dry weight of polyurethane.

The outer printability layer may comprise at least 5% by dry weight of a mineral filler, especially of silica and/or kaolin and/or talc and/or calcium carbonate.

The outer printability layer may comprise between 1% and 15% by dry weight and better still between 1% and 3% by dry weight of crosslinking agent.

A subject of the invention is also a process for manufacturing a bank note, in which a sheet of paper as defined above is printed on its outer printability layer, especially by intaglio printing.

Fibrous Substrate

The fibrous substrate comprises papermaking fibers and any additives suitable for the manufacturing thereof. In particular, the fibrous substrate of mainly cellulosic nature may be reinforced by the addition of synthetic fibers in an amount of between 1% and 50% and preferably between 5% and 15% by mass.

When it is intended for manufacturing bank notes, the fibrous substrate may comprise cellulose fibers and more particularly cotton fibers. Other vegetable fibers from annual plants may be included in the composition of the fibrous substrate.

The fibrous substrate may have one or more plies of paper assembled in the wet state.

The fibrous substrate may have, as dry finished paper, before sizing and deposition of the protective coat, a basis weight of between 20 and 120 g/m$^2$ and a thickness of between 30 and 180 μm.

The fibrous substrate may comprise one or more watermarks and also one or more security elements.

Among the security elements that may be incorporated into the fibrous substrate, some are detectable to the eye, in daylight or in artificial light, without the use of a particular device. These security elements comprise, for example, colored fibers or flakes, and partially or totally printed or metalized yarns. These security elements are said to be first-level elements.

Other types of additional security elements are detectable only by using a relatively simple device, such as an ultraviolet (UV) or infrared (IR) lamp. These security elements comprise, for example, fibers, flakes, strips, yarns or particles. These security elements may or may not be visible to the naked eye, for example being luminescent under lighting from a Wood lamp emitting at a wavelength of 365 nm. These security elements are said to be second-level elements.

Other types of security elements require for their detection a more sophisticated detection device. These security elements are capable, for example, of generating a specific signal when they are subjected, simultaneously or non-simultaneously, to one or more external excitation sources. Automatic detection of the signal makes it possible to authenticate, where appropriate, the document. These security elements comprise, for example, traces in the form of active materials, particles or fibers, capable of generating a specific signal when these traces are subjected to an optronic, electric, magnetic or electromagnetic excitation. These security elements are said to be third-level elements.

Reagents may also be incorporated into the fibrous substrate, which are, for example, chemical or biochemical falsification-preventing and/or authentication and/or identification reagents which can especially react, respectively, with at least one falsification and/or authentication and/or identification agent.

The security element(s) present in the fibrous substrate may have first-level, second-level or third-level security characteristics.

Protective Coating

Base Layer

The base layer comprises any polymer that is capable of giving the coat barrier properties, so as to protect the fibrous substrate from soiling.

The barrier properties are equivalent to those of a plastic film. Thus, the sheet of paper according to the invention especially has resistance to soiling equivalent to that of a fibrous substrate equipped with a laminated, backing or thermoformed film.

The base layer is preferably present, per face, at a rate of from 1 to 24 g/m$^2$ by dry weight, better still 1 to 15 g/m$^2$ and even better still 2 to 5 g/m$^2$.

The thickness per face of the base layer ranges, for example, from 1 to 24 μm, better still from 1 to 15 μm and even better still from 2 to 5 μm.

The base layer is deposited on each face in the liquid state by coating or impregnation, preferably on line on the paper machine, preferably using a two-roll treater.

The base layer is initially, preferably, a preparation in aqueous phase, especially an emulsion or a dispersion.

The base layer is preferably based on PU, polyolefin or PVDC. As a variant, an acrylic, styrene or fluorinated polymer, especially of PVDF type, may be used.

TABLE 1

Example of a PU-based base layer (referred to hereinbelow as a PU formula).

| Compound | Supplier | Family/function | Amount per 100 g |
|---|---|---|---|
| Cromelastic SE871 | Cromogenia-Units | Polyurethane/binder | 87.9 g |
| Nopco 8034 | Nopco | Surfactant/antifoam | 0.1 g |
| Cab-o-sperse PG002 | Cabot | Colloidal silica/printability filler | 6.8 g |
| Crosslinker CX100 | Zeneca Resins | Polyaziridine/crosslinking agent | 2.6 g |
| Water | N/A | Solvent | 2.6 g |

TABLE 2

Example of a polyolefin-based base layer (referred to hereinbelow as a PE formula).

| Compound | Supplier | Family/function | Amount per 100 g |
|---|---|---|---|
| Hypod 8502.01 | Dow | Modified polyethylene comprising carboxylic acid groups/binder | 92.0 g |
| Crosslinker CX100 | Zeneca Resins | Polyaziridine/crosslinking agent | 5.3 g |

TABLE 3

Example of a PVDC-based base layer (referred to hereinbelow as a PVDC formula).

| Compound | Supplier | Family/function | Amount per 100 g |
|---|---|---|---|
| Diofan A 063 | Solvay | PVDC/binder | 100.0 g |

Presizing

Preferably, the fibrous substrate is presized before coating or impregnation with the composition intended to form the base layer.

The presizing is preferably performed with a PVA-based binder. Polyvinyl alcohol is dissolved in water to a proportion of 1% to 10% by mass, preferably between 3% and 6% before impregnation of the paper substrate. Other binders may be envisioned, in addition to or in replacement for PVA, such as the dispersions based on styrene or acrylic polymers, as mentioned above.

Outer Printability Layer

The outer layer is initially, preferably, a preparation in aqueous phase, especially an emulsion or a dispersion.

In accordance with the invention, the outer printability layer is based on PU.

Polyurethane is applied, preferably in the form of an aqueous dispersion of polyurethane or propolyurethane particles.

The polyurethane may be present in the composition intended to form the outer layer in a mass content of between 40% and 100% relative to the total weight of the composition.

The composition intended to form the outer layer may comprise a crosslinking agent chosen from isocyanates, carbodiimides and aziridines. The crosslinking agent may be in a mass content, by dry weight, of between 1% and 15% and better still 1% to 3% relative to the total weight of the composition before layering.

The composition intended to form the outer layer also preferably comprises a mineral filler chosen from silica, kaolin, talc and calcium carbonate.

The composition intended to form the outer layer also preferably comprises a filler in a mass proportion by dry weight of between 1% and 60% and better still between 3% and 10%, relative to the total weight of the composition.

TABLE 4

Example of an outer printability layer (same PU formula as above).

| Compound | Supplier | Family/function | Amount per 100 g |
| --- | --- | --- | --- |
| Cromelastic SE871 | Cromogenia-Units | Polyurethane/binder | 87.9 g |
| Nopco 8034 | Nopco | Surfactant/antifoam | 0.1 g |
| Cab-o-sperse PG002 | Cabot | Colloidal silica/printability filler | 6.8 g |
| Crosslinker CX100 | Zeneca Resins | Polyaziridine/crosslinking agent | 2.6 g |
| Water | N/A | Solvent | 2.6 g |

Coating Means

To apply the base layer, use is preferably made, as mentioned previously, of an on line two-roll treater, especially comprising premetering rolls, engraved rolls or transfer rolls before metering at the outlet.

To apply the outer printability layer, use is preferably made of a two-sided air-knife coater, for example of the type TWIN™ ABC.

Furthermore, simultaneous layering units, for example of TWIN™ ABC type, or with rolls, for example of TWIN™ Sizer gravure or TWIN™ Sizer HSM type, may be envisioned for layering the two faces in a single run.

The application of each layer, or optionally of all of the layers, will be followed by drying, for example with hot air or infrared, possibly assisted with heating rolls. The surface temperature reached will be at least 30° C. and at most 180° C., in relation with the residence time of the layered paper in the heating unit.

EXAMPLES

Examples 1 to 3 according to the invention below were formed using a fibrous substrate composed of cotton cellulose fibers. The fibrous substrate is sized at the outlet of the paper-forming tank by soaking in a bath of PVA dissolved at 6% in water so as to deposit 88 µg/m² of PVA by dry weight.

The characteristics of the deposited layers and the properties obtained are detailed in the tables below.

The first (base) layer is deposited by impregnation on a sizing press. The second (outer) layer is deposited by pencil layering.

Example 1

A sheet is prepared comprising the paper substrate defined above, which is coated with a two-layer protective coat comprising a PU-based base layer, deposited at a rate of 2.2 g/m²/face by dry weight, and an outer layer which is also PU-based, deposited at a rate of 5.4 g/m²/face by dry weight.

The following results are obtained, collated in Table 4 below:

TABLE 4

Results from Example 1.

| Abrasion of the printed inks | 4.0 | Very good |
| --- | --- | --- |
| Soiling in aqueous phase | 3.5 | Good |
| Pulverulent soiling | 5.8 | Good |

Example 2

A sheet is prepared comprising the paper substrate defined above, coated with a two-layer protective coat comprising a PE-based base layer, deposited at a rate of 2.4 g/m²/face by dry weight and a PU-based outer layer deposited at a rate of 4.8 g/m²/face by dry weight.

The following results are obtained, collated in Table 5 below:

TABLE 5

Results from Example 2.

| Abrasion of the printed inks | 4.5 | Very good |
| --- | --- | --- |
| Soiling in aqueous phase | 3.2 | Good |
| Pulverulent soiling | 4.6 | Very good |

Example 3

A sheet is prepared comprising the paper substrate defined above, coated with a two-layer protective coat comprising a PVDC-based base layer, deposited at a rate of 4.8 g/m²/face by dry weight and a PU-based outer layer deposited at a rate of 4.8 g/m²/face by dry weight.

The following results are obtained, collated in Table 6 below:

TABLE 6

Results from Example 3.

| Abrasion of the printed inks | 4.0 | Very good |
| --- | --- | --- |
| Soiling in aqueous phase | 2.8 | Very good |
| Pulverulent soiling | 4.4 | Very good |

Example 4

Comparative

A sheet is prepared comprising the paper substrate of examples 1 to 3, which is coated with a PU-based layer in an amount of 2.3 g/m²/face by dry weight.

The following results are obtained, collated in Table 7 below:

TABLE 7

Results from Example 4.

| Abrasion of the printed inks | 3.5 | Good |
| --- | --- | --- |
| Soiling in aqueous phase | 10.4 | Poor |
| Pulverulent soiling | 10.7 | Poor |

Preparation of Examples 1 to 4

The compositions of the PE, PU and PVDC formulae have been given above.

TABLE 8

Compositions of Examples 1-4.

|  |  | Examples | | | |
|---|---|---|---|---|---|
|  |  | 1 | 2 | 3 | 4 |
| 1st layer | 1st layer | PU formula | PE formula | PVDC formula | PU formula |
|  | 2nd layer | PU formula | PU formula | PU formula | — |
|  | Dispersion in aqueous phase | PU | PE | PVDC | PU |
|  | Final pH | 8.9 | 10.6 | 2.4 | 9.0 |
|  | Brookfield viscosity 100 rpm in cps | 122 cps | 193 cps | 37 cps | 122 cps |
|  | Application process | Surfacing | | | |
|  | Drying temperature | 105° C. | | | |
|  | Drying time | 3 min | | | |
|  | DE (dry extract) | 36.6% | 44.1% | 50.0% | 36.6% |
|  | Wet uptake per face | 6.1 g/m² | 5.5 g/m² | 9.7 g/m² | 6.2 g/m² |
|  | Dry uptake per face | 2.2 g/m² | 2.4 g/m² | 4.8 g/m² | 2.3 g/m² |
| 2nd layer | Dispersion in aqueous phase | PU | | | — |
|  | Final pH | 8.9 | | | — |
|  | Brookfield viscosity 100 rpm in cps | 103 cps | | | — |
|  | Application process | Pencil layering | | | — |
|  | Drying temperature | 105° C. | | | — |
|  | Drying time | 10 min | | | — |
|  | DE (dry extract) | 36.6% | | | — |
|  | Wet uptake per face | 14.7 g/m² | 13.0 g/m² | 13.2 g/m² | — |
|  | Dry uptake per face | 5.4 g/m² | 4.8 g/m² | 4.8 g/m² | — |
| Total | Total dry uptake g/m² per face | 7.6 g/m² | 7.2 g/m² | 9.7 g/m² | 2.3 g/m² |

Example 5

Comparative

This is a sheet sold under the reference Hybrid by the company Louisenthal comprising a papermaking substrate colaminated with a coat comprising a layer of PU adhesive at 7.0 g/m²/face, a PET film at 6.0 g/m²/face and an acrylic varnish at 7.0 g/m²/face.

The following results are obtained, collated in Table 8 below:

TABLE 8

Results from Example 5.

| Abrasion of the printed inks | 2.5 | Average |
|---|---|---|
| Soiling in aqueous phase | 0.0 | Very good (but spots on the edges) |
| Pulverulent soiling | 6.3 | Average |

Performance

Resistance and Durability Tests

Washing Resistance Tests

The test of resistance to washing known as "low concentration lye" consists in placing samples (of dimensions 6.7 cm×6.7 cm) of paper, printed intaglio on one face and left to dry for 8 days, in sewn textile bags, which are placed in a jar rotated for 1 hour at 67 revolutions per minute (rpm) in contact with a solution of water at 95° C.±2° C. containing 750 g of water and 7.5 g of washing powder of Ariel® brand. Each jar contains six bags. After exposure to the lye, the samples are rinsed and drained with the fingers.

The samples are graded from 0 to 5 (5 corresponding to an absence of reduction of the intensity of the print and 0 to total disappearance of the image).

Pelikan Test

The Pelikan test consists soaking two samples (7 cm×4 cm) in a solution of Pelikan blue 4001 ink diluted to 10% in demineralized water for 10 minutes, removing them and placing them between two sheets of blotting paper, pressing by forming two forward-return rolls with a 10 kg stainless-steel roll, leaving to dry completely and evaluating the colorimetric

TABLE 9

Performance determined from Example 5.

|  |  | Examples | | | |
|---|---|---|---|---|---|
|  |  | 1 | 2 | 3 | 4 |
| 1st layer |  | PU formula | PE formula | PVDC formula | PU formula |
| 2nd layer |  | PU formula | PU formula | PU formula | — |
| Basis weight | g/m² | 105.7 | 104.0 | 109.9 | 93.0 |
| Bendtsen porosity (standard NF D03-076) | ml/min | 0.0 | 0.0 | 0.0 | 0.0 |
| Cobb 1 min (standard ISO 533: 1991) | g/m² | 1.4 | 1.0 | 0.7 | 13.9 |
| Dry crumping | ml/min | 0.9 | 2.0 | 1.4 | 21.6 |
| Soiling in aqueous phase | $I_S$ | 3.5 | 3.2 | 2.8 | 10.4 |
| Low concentration lye | Notation | 4.5 | 4.5 | 5.0 | 3.0 |
| Abrasion of the printed inks | Notation | 4.0 | 4.5 | 4.0 | 3.5 |
| Pulverulent soiling | $\Delta E^*$ | 5.8 | 4.6 | 4.4 | 10.7 |
|  | Grade | 4 | 4/5 | 4/5 | 3 |
| Pelikan | $\Delta E^*$ | 1.6 | 1.6 | 3.4 | 13.8 |
|  | Grade | 4.5 | 4.5 | 4.5 | 3.5 | difference ΔE* (Elrepho USAV395 measurement white plate in the CIE L*a*b* colorimetric space under a D65 illuminant and observation at 10°, according to standard NF EN ISO 11664-4) before and after exposure to the ink on each face.

TABLE 10

Results from the Pelikan test.

| Delta E* | Absorption level |
|---|---|
| 0 | 5 |
| >0-5 | 4.5 |
| >5-10 | 4 |
| >10-15 | 3.5 |
| >15-20 | 3 |
| >20-25 | 2.5 |
| >25-30 | 2 |
| >30-50 | 1.5 |
| >50 | 1 |

Test of Resistance to Soiling in Aqueous Phase

The following are prepared:

1. a Composition of Sweat A:
Distilled water: 500 g
NaCl: 5 g
Lactic acid: 5 g
Urea: 0.5 g
Histidine hydrochloride: 0.5 g
Water: qs 1000 g 2. a Pulverulent Colored Composition B:
Bayferrox 420 from the company Lanxess (Bayer): 0.833 g
Bayferrox 610 from the company Lanxess (Bayer): 0.833 g
Microlith black C-K from the company BASF (CIBA): 0.083 g
Vermiculite 2D from the company Efisol: 248.25 g
Compounds (1) and (2) are mixed using a Turbula mixer for 30 minutes in a plastic bottle with six large ceramic beads.

3. a Fatty Composition C:
The following starting mixture is used:
Lanoline Lanor TEC from the company Lanolines de la Tossée; 200 g
Disponil TD 0785 from the company Nopco: 20 g The mixture is homogenized until the lanoline melts. 28 g of water are added with stirring, followed by 16 g of Eumulgin BA 10 from the company Nopco, and mixing is performed with heating until a homogeneous preparation is obtained. The mixture is allowed to cool to room temperature and 24 g of water are added, with mixing for 15 minutes. Next, a further 190 g of water are added, very slowly at the start. An emulsion containing 42% lanoline is obtained.

Each sample is creased 4 times beforehand manually with the IGT creasing machine.

The samples (75 mm×140 mm) are mounted on wooden blocks (60×35×35 mm), about which the samples are maintained with three faces exposed.

20 g of fatty composition, 10 g of pulverulent colored composition and 90 ml of artificial sweat composition and 25 ceramic beads with a maximum diameter of 20 mm are placed in a 2 L plastic jar. The mixture is shaken and the four dry wooden blocks onto which the samples have been placed are then introduced.

The jar is closed and shaken in the Turbula mixer at 67 rpm for 20 minutes.

The samples are then rinsed with running water, dried using two sheets of blotting paper and then placed in an oven at 60° C. for 3 minutes.

The samples are then ironed between two sheets of blotting paper with an iron in position ⅔.

The samples are calendered one by one with one passage per side, at a pressure of 15 bar, at the minimum speed.

Evaluation of the soiling index $I_s$ is then performed:

$$I_S = \frac{(W_1 - W_0) + (Y_1 - Y_0)}{2}$$

in which $W_1$ is the whiteness measured on the samples after the test, $W_0$ is the whiteness before the test, $Y_1$ is the degree of yellowing after the test and $Y_0$ is the degree of yellowing before the test. The whiteness is a mean value of three measurements according to standard NF ISO 2470-2 6167 and the degree of yellowing is a mean value of three measurements (measurement with the Datacolor Elrepho 300(1 machine from the company Lorentzen & Wettre which is common in the papermaking field).

The alumina beads must not weigh less than 300 g. They are conditioned before use by placing them in the Turbula with an abrasive cream and a small amount of water for 1.5 hours.

Abrasion of the Printed Inks

Artificial sweat composition: composition A, the formula of which is given above.

Abrasive composition: Vermiculite 2D (EFISOL).

Fatty composition: same formula as fatty composition C above.

The samples are printed with a blue ink S12W from SICPA left to polymerize for 8 days before the test, the printing being performed in intaglio mode.

The samples are 75×140 mm strips.

20 g of fatty composition, 10 g of abrasive composition and 90 ml of artificial sweat and 25 ceramic heads with a maximum diameter of 20 mm are placed in a 2 L plastic bottle.

After creasing, the samples are mounted on four den blocks as in the preceding test.

The whole is rotated for 20 minutes at 67 rpm.

The rinsing and drying of the samples are performed as described in the preceding test.

The results are evaluated with a visual scale ranging from 1 to 5 (1=sample severely degraded, 5=absence of deterioration).

Test with the Pulverulent Soiling

Equipment
metal drum (23 cm×23 cm×33 cm) with lid
2 kg of glass beads 2.5 mm in diameter
rubber with male and female spreading
drop counter
punching machine
clean cloth
beaker Composition of the Soiling Mixture

| Kaolin - Thai earth (325 mesh) | 0.3 g |
|---|---|
| Olive oil | 0.4 g |
| Soybean oil | 0.4 g |
| Ethanol | 0.4 g |

Preparation of the Specimens

Chop the specimens in note format (large length in the running direction)

Make a hole at each corner about 9 mm from each corner

Place a rubber weight on each corner and grip tightly.

Preparation of the Soiling Mixture

Mix 0.3 g of kaolin with 2000 g of glass beads

Add 0.4 g of olive oil, soybean oil and ethanol

Mix for 5 minutes in the metal drum at 60 revolutions/minute.

Procedure

Add 20 samples to the metal drum

Rotate at 60 rpm (metal drum horizontal) for 15 minutes in one direction and then in the other Remove the samples and take off the rubber weights Dry three times with a moist cloth and then once with a dry cloth on each face Next, perform the evaluation by calculating the colorimetric difference ΔE* (Elrepho USAV395 measurement white plate in the CIE L*a*b* colorimetric space under D65 illuminant and observation at 10°, according to standard NF EN ISO 11664-4) from the measurements on the samples before and after the test.

The measurements are performed on five positions of the specimens.

Very good results are found with the papers according to the invention in the three tests "abrasion of the printed inks", "soiling in aqueous phase" and "pulverulent soiling".

The invention is not limited to the illustrated examples.

The expression "comprising a" is synonymous with "comprising at least one".

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. A high-durability sheet of paper, especially for manufacturing bank notes, comprising:
   a fibrous substrate,
   a protective coat totally covering at least one face of the fibrous substrate, this coat comprising at least one base layer on the substrate side and a polyurethane-based non-fluorinated outer printability layer, covering the base layer, the outer printability layer comprising a mineral filler.

2. The sheet as claimed in claim 1, the total thickness of protective coat being greater than or equal to 3 μm.

3. The sheet as claimed in claim 1, the outer printability layer thither comprising a polymer-particle.

4. The sheet as claimed in claim 3, the outer printability layer comprising the polymer-particle, mineral filler, or a combination thereof, in a mass content, by dry weight, of less than 50%, in the outer printability layer.

5. The sheet as claimed in claim 3, the mineral filler of the outer printability layer comprising silica, kaolin, talc, calcium carbonate, or a combination thereof.

6. The sheet as claimed in claim 1, the outer printability layer comprising at least 25% by dry weight of polyurethane.

7. The sheet as claimed in claim 6, the outer printability layer comprising at least 30% by dry weight of polyurethane.

8. The sheet as claimed in claim 6, the outer printability layer comprising at least 50% by dry weight of polyurethane.

9. The sheet as claimed in claim 6, the outer printability layer comprising between 25% and 50% by dry weight of polyurethane.

10. The sheet as claimed in claim 9, the outer printability layer comprising an acrylic compound mixed with polyurethane.

11. The sheet as claimed in claim 10, the acrylic compound being mixed with the polyurethane in substantially equal proportions.

12. The sheet as claimed in claim 1, the base layer comprising a polyolefin.

13. The sheet as claimed in claim 1, the base layer comprising PVDC.

14. The sheet as claimed in claim 1, the base layers comprising a fluorinated polymer or an acrylic polymer.

15. A high-durability sheet of paper, especially for manufacturing bank notes, comprising:
    a fibrous substrate,
    a protective coat totally covering at least one face of the fibrous substrate, this coat comprising at least one base layer on the substrate side and a polyurethane-based non-fluorinated outer printability layer, covering the base layer, the base layer comprising a polyolefin or PVDC.

16. The sheet as claimed in claim 15, the base layer comprising the polyolefin.

17. A process for manufacturing a high-durability sheet, especially for bank notes, comprising the step consisting in on-line layering in the fluid state on a fibrous substrate of a base layer and in on-line or off-line layering on the base layer of a polyurethane-based non-fluorinated outer printability layer, the outer printability layer comprising a mineral filler.

18. The process as claimed in claim 17, the layering of the base layer taking place on line using a two-roll treater.

19. The process as claimed in claim 18, the fibrous substrate being sized prior to its passage through the two-roll treater.

20. The process as claimed in claim 19, the sizing being performed with PVA.

21. The process as claimed in claim 17, the layering of the outer printability layer being formed on line.

22. The process as claimed in claim 17, the substrate having two faces, the layering of the base layer and that of the outer printability layer taking place on the two faces of the substrate.

23. The process as claimed in claim 22, the base layer being deposited in an amount ranging from 1 to 24 g/m² per face, by dry weight.

24. The process as claimed in claim 22, the outer printability layer being deposited in an amount ranging from 1 to 24 g/m² per face, by dry weight.

25. The process as claimed in claim 17, the base layer comprising a polymer chosen from PU, polyolefins and PVDC.

26. The process as claimed in claim 17, the outer printability layer comprising at least 25% by dry weight of polyurethane.

27. The process as claimed in claim 17, the outer printability layer comprising at least 5% by dry weight of a polymer-particle, mineral filler, or a combination thereof.

28. The process as claimed in claim 17, the outer printability layer comprising between 1% and 15% by dry weight of crosslinking agent.

29. A process for manufacturing a high-durability sheet, especially for bank notes, comprising the step consisting in the on-line layering in the fluid state on a fibrous substrate of a base layer and the on-line or off-line layering on the base layer of a polyurethane-based non-fluorinated outer printability layer, the base layer comprising a polyolefin or PVDC.

30. The sheet as claimed in claim 29, the base layer comprising the polyolefin.

* * * * *